United States Patent [19]
Hine

[11] Patent Number: 4,760,568
[45] Date of Patent: Jul. 26, 1988

[54] OPTICAL INFORMATION PROCESSING DEVICE

[75] Inventor: Shiro Hine, Itami, Japan

[73] Assignee: Mitsubishi Denki Kabushiki Kaisha, Tokyo, Japan

[21] Appl. No.: 911,432

[22] Filed: Sep. 25, 1986

[30] Foreign Application Priority Data

Sep. 26, 1985 [JP] Japan .................................. 60-21354

[51] Int. Cl.$^4$ .............................................. G11B 7/00
[52] U.S. Cl. .................................... 369/122; 369/112; 369/120; 369/46; 350/96.11
[58] Field of Search ............... 369/100, 112, 116, 120, 369/122; 350/96.11–96.13, 96.15; 372/36; 365/46

[56] References Cited

U.S. PATENT DOCUMENTS

| 4,293,826 | 10/1981 | Scifres et al. | 372/44 |
| 4,411,057 | 10/1983 | Duda et al. | 372/36 X |
| 4,546,478 | 10/1985 | Shimizu et al. | 372/36 |
| 4,640,574 | 2/1987 | Unger | 350/96.11 |

FOREIGN PATENT DOCUMENTS

| 3307669 | 9/1984 | Fed. Rep. of Germany | 350/96.15 |
| 3534776A1 | 4/1986 | Fed. Rep. of Germany | . |
| 61-63821 | 4/1986 | Japan | 350/96.11 |

OTHER PUBLICATIONS

Electro–Optics–Technology Report–May 1986, pp. 56, 58, 60.

IBM Tech. Dis. Bulletin; vol. 25, No. 4; Sep. 82 pp. 2188–2189.

"High–Performance Focusing Grating Coupler Fabricated by Electron–Beam Writing" T. Suhara et al., Technical Digest of Seventh Topical Meeting on Integrated and Guided–Wave Optics, ThD4, Florida, Apr. 24–26 (1984).

"Integrated Optical Photodetector", D. B. Ostrowsky, et al., Appl. Phys. Lett., vol. 22, No. 9, 1 May 1973, pp. 463–464.

Primary Examiner—Aristotelis M. Psitos
Attorney, Agent, or Firm—Lowe, Price, LeBlanc, Becker & Shur

[57] ABSTRACT

An optical head for a laser memory disk in accordance with the present invention comprises: a substrate (1); a waveguide layer (3) formed over a main surface of the substrate; a semiconductor laser (4) for injecting laser beams into the waveguide layer, the semiconductor laser being set in a hollow (17) dug down at least into the waveguide layer; a focusing grating coupler (6) formed on the waveguide layer for focusing the injected laser beams on the memory disk and introducing beams reflected back from the disk into the waveguide; beam splitter means (5) formed on the waveguide layer between the semiconductor laser and the focusing grating coupler, for bisecting each of the reflected beams at a prescribed acute angle; and photodetector means (10) for converting the bisected beams into electrical signals, the photodetector means being provided along both the sides of the semiconductor laser and situated not nearer to the focusing grating coupler as compared with the semiconductor laser.

9 Claims, 1 Drawing Sheet

OPTICAL INFORMATION PROCESSING DEVICE

BACKGROUND OF THE INVENTION

1. Field of the Invention

The present invention generally relates to an optical device, and more particularly to an optical head which can precisely focus a light spot on an optical memory disk and has a high S/N ratio.

2. Description of the Prior Art

A high-performance focusing grating coupler fabricated by electron-beam writing is described by T. Suhara et al. in Technical Digest of Seventh Topical Meeting on Integrated and Guided-Wave Optics, ThD4; Florida, U.S.A., Apr. 24–26 (1984). Further, an integrated optical photodetector is disclosed by D. B. Ostrowsky et al. in Appl. Phys. Lett. Vol. 22, No. 9, 1973, p. 463.

FIG. 1 is a schematic perspective view of an optical head which is integrated electro-optically according to the prior art. A substrate 1 is provided with a buffer layer 2 on which an optical waveguide layer 3 of a dielectric is formed. The buffer layer 2 can be formed by oxidation, evaporation or the like, while the waveguide layer 3 can be formed by evaporation, sputtering or the like. Beam splitters 5 and a focusing grating coupler 6 are fabricated on the waveguide layer 3 by photolithography or a combination of electron beam writing and plasma etching. The optical head is further provided with a semiconductor laser 4 and photodetectors 10.

In operation, laser beams 7 are injected into the waveguide layer 3 from the semiconductor laser 4. The laser beams 7 transmitted through the waveguide 3 are focused on an optical memory disk 8 by the focusing grating coupler 6 and make a focused light spot 12. After reading a signal pit 9 on the disk 8 by the focused light spot 12, light beams 13 reflected from the disk 8 are again introduced into the waveguide layer 3 by the focusing grating coupler 6. Each of these laser beams introduced back into the waveguide 3 is bisected by the beam splitter 5 and then the bisected beams 15 change their direction at 30° oppositely. One set of the bisected beams 15 converges toward one set of photodetectors 10 which are situated near to one side of the semiconductor laser 4, while the other set of the bisected beams 15 converges toward another set of photodetectors 10 which are situated near to the other side of the semiconductor laser 4. These convergent beams 15 are efficiently converted into electrical signals by the respective photodetectors 10.

Since the waveguide layer 3 is also formed between the semiconductor laser 4 and the photodetectors 10 in the electro-optically integrated head of FIG. 1, there may exist the so-called stray beams 16 which are emitted divergently from the semiconductor laser 4 and are directly incident upon the photodetectors 10. These stray beams 16 cause noise in the output of photodetectors 10 and thus lower the S/N ratio of the optical head.

Further, in order to efficiently and properly inject laser beams from the semiconductor laser 4 into the waveguide layer 3, the semiconductor laser 4 should be set in place with a high accuracy in assembling the optical head.

SUMMARY OF THE INVENTION

In view of the prior art, it is an object of the present invention to provide an optical head having an improved S/N ratio.

It is another object of the present invention to provide an optical head which can be easily assembled and be suited for mass production.

An optical head for a laser memory disk in accordance with the present invention comprises: a substrate; a waveguide layer formed over a main surface of the substrate; a semiconductor laser for injecting laser beams into the waveguide layer, the semiconductor laser being set in a hollow dug down at least into the waveguide layer; a focusing grating coupler formed on the waveguide layer for focusing the injected laser beams on the memory disk and introducing beams reflected back from the disk into the waveguide; beam splitter means formed on the waveguide layer between the semiconductor laser and the focusing grating coupler, for bisecting each of the reflected beams at a prescribed acute angle; and photodetector means for converting the bisected beams into electrical signals, the photodetector means being provided along both the sides of the semiconductor laser and situated not nearer to the focusing grating coupler as compared with the semiconductor laser.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
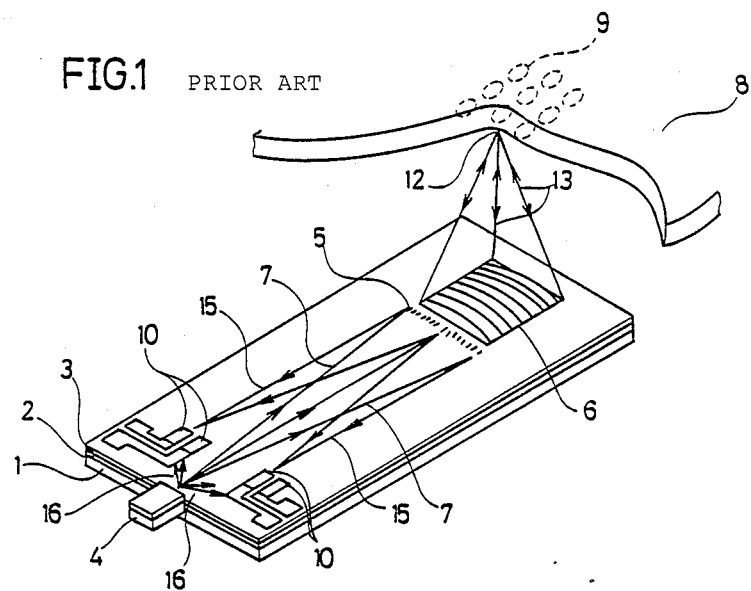
FIG. 1 is a schematic perspective view of an optical head according to the prior art.
Figure 2:
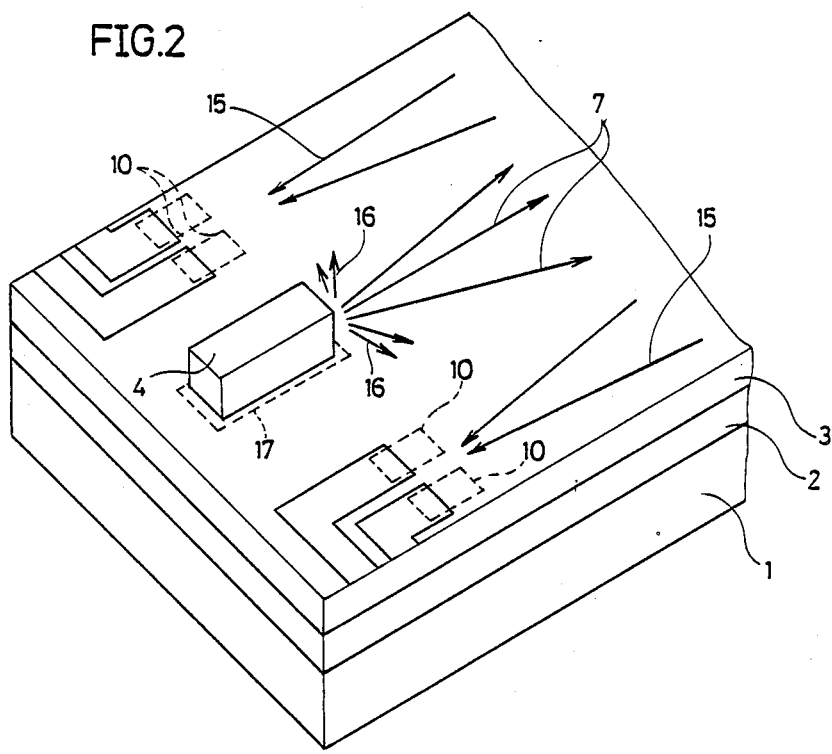
FIG. 2 is an enlarged fragmentary perspective view of an optical head in accordance with the present invention.

Referring to FIG. 2, there is shown only a distinctive portion of an optical head according to an embodiment of the present invention. The optical head of FIG. 2 is similar to that of FIG. 1, except that the semiconductor laser 4 is set in a hollow 17 dug down through both the waveguide layer 3 and the buffer layer 2 to the substrate 1 and situated not farther away from the focusing grating coupler 6 as compared with the photodetectors 10. The hollow 17 may be further dug down by etching into the substrate 1 according to circumstances. The depth of the hollow 17 is determined so that laser beams emitted from the semiconductor laser 4 may be properly and efficiently injected into the waveguide layer 3. Namely, the beam-emitting area of the semiconductor laser 4 is set to be level with the waveguide layer 3. The semiconductor laser 4 is connected to external bonding pads through bonding wires.

In operation, the optical head of FIG. 2 functions similarly as that of FIG. 1. In the optical head of FIG. 2, however, the photodetectors 10 do not receive any stray beams 16, since the photodetectors 10 are situated not ahead of the semiconductor laser 4 in the directions of the stray beams 16.

As a result, noise in output of the photodetectors 10 is decreased without lowering the signal level and thus the S/N ratio of the optical head is increased.

Further, since the semiconductor laser 4 is in direct contact with the Si substrate 1 which has a good thermal conductivity and acts as a heat sink, the beam emission of the semiconductor laser 4 becomes efficient and stable.

Still further, the semiconductor laser 4 can be readily set in the hollow 17 prepared in advance. Namely, the optical head can be easily assembled and thus is suitable for mass production.

Although the semiconductor laser 4 and the photodetector 10 are situated side by side in FIG. 2, the semiconductor laser 4 may be situated nearer to the focusing grating coupler 6 as compared with the photodetectors 10 according to circumstances.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical head for a laser memory disk comprising:
    a substrate (1);
    a waveguide layer (3) formed over a main surface of said substrate;
    a semiconductor laser (4) for injecting laser beams into said waveguide layer, said semiconductor laser being set in a hollow (17) extending down at least into said waveguide layer;
    a focusing grating coupler (6) formed on said waveguide layer for focusing said injected laser beams on said memory disk and introducing beams reflected back from the disk into said waveguide;
    beam splitter means (5) formed on said waveguide layer between said semiconductor laser and said focusing grating coupler, for bisecting each of said reflected beams at a prescribed acute angle; and
    photodetector means (10) for converting said bisected beams into electrical signals, said photodetector means being provided along both the sides of said semiconductor laser, said laser being spaced from said focusing grating coupler by a distance not greater than the distance between said photodetector means and the focusing grating coupler to thereby prevent stray beams tending to diverge from the laser from being received by the photodetector means.

2. An optical head in accordance with claim 1, wherein said hollow (17) extends down through said waveguide layer to said substrate.

3. An optical head in accordance with claim 2, wherein said hollow extends down into said substrate.

4. An optical head in accordance with claim 1 further comprising a buffer layer (2) interposed between said substrate and said waveguide layer.

5. An optical head in accordance with claim 4, wherein said hollow extends down through said waveguide layer to said buffer layer.

6. An optical head in accordance with claim 5, wherein said hollow extends down into said buffer layer.

7. An optical head in accordance with claim 6, wherein said hollow extends down through both said waveguide layer and said buffer layer to said substrate.

8. An optical head in accordance with claim 7, wherein said hollow extends down into said substrate.

9. An optical head arrangement for a laser memory disk comprising:
    a substrate;
    a waveguide layer overlying the substrate;
    a semiconductor laser for injecting a laser beam into said waveguide layer;
    a focusing grating coupler formed on said waveguide layer for focusing said injected laser beams on said memory disk and directing beams reflected back from the disk into said waveguide;
    beam splitter means formed on said waveguide layer between said semiconductor laser and said focusing grating coupler; and photodetector means for converting the reflected laser beams into electrical signals, said photodetector means being provided at one end of the substrate adjacent the laser and said semiconductor laser being located relative to the photodetector means so as to prevent stray beams tending to divert from the laser from being received by the photodetector means.

* * * * *